(12) United States Patent
Molony et al.

(10) Patent No.: US 10,480,333 B2
(45) Date of Patent: Nov. 19, 2019

(54) TURBINE BLADE INCLUDING BALANCED MATEFACE CONDITION

(71) Applicant: United Technologies Corporation, Farmington, CT (US)

(72) Inventors: Evan P. Molony, Farmington, CT (US); Carey Clum, East Hartford, CT (US); Wolfgang Balzer, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 220 days.

(21) Appl. No.: 15/607,998

(22) Filed: May 30, 2017

(65) Prior Publication Data

US 2018/0347381 A1 Dec. 6, 2018

(51) Int. Cl.
| | |
|---|---|
| *F01D 5/14* | (2006.01) |
| *F01D 5/30* | (2006.01) |
| *F01D 11/00* | (2006.01) |
| *F01D 9/04* | (2006.01) |

(52) U.S. Cl.
CPC ............ *F01D 5/3015* (2013.01); *F01D 5/141* (2013.01); *F01D 5/143* (2013.01); *F01D 5/147* (2013.01); *F01D 9/042* (2013.01); *F01D 11/006* (2013.01); *F01D 5/145* (2013.01); *F01D 9/041* (2013.01); *F05B 2240/301* (2013.01); *F05B 2240/80* (2013.01); *F05D 2240/11* (2013.01); *F05D 2240/80* (2013.01)

(58) Field of Classification Search
CPC ....................................................... F01D 5/143
See application file for complete search history.

(56) References Cited

U.S. PATENT DOCUMENTS

| | | | | | |
|---|---|---|---|---|---|
| 3,185,441 | A | * | 5/1965 | Reuter ................... | F01D 5/225 29/889.21 |
| 4,135,857 | A | * | 1/1979 | Pannone ................. | F01D 5/143 416/193 A |
| 4,420,288 | A | * | 12/1983 | Bischoff ................. | F01D 5/145 416/244 A |

(Continued)

FOREIGN PATENT DOCUMENTS

| | | |
|---|---|---|
| EP | 1326005 | 7/2003 |
| EP | 1798374 | 6/2007 |

(Continued)

OTHER PUBLICATIONS

European Search Report for Application No. 18173429.4 dated Oct. 11, 2018.

*Primary Examiner* — Carlos A Rivera
*Assistant Examiner* — Behnoush Haghighian
(74) *Attorney, Agent, or Firm* — Carlson, Gaskey & Olds, P.C.

(57) ABSTRACT

A blade for a gas powered turbine includes a platform having a leading edge and a trailing edge. The leading edge is connected to the trailing edge by a suction side mateface and by a pressure side mateface. A blade extends outward from the platform. The blade has a foil shaped cross section and a suction side of the blade faces the suction side mateface and a pressure side of the blade faces the pressure side mateface. A radial height of the suction side mateface is different from a radial height of the pressure side mateface at a first axial position.

16 Claims, 6 Drawing Sheets

(56) References Cited

U.S. PATENT DOCUMENTS

| | | | | |
|---|---|---|---|---|
| 6,158,961 A * | 12/2000 | Kehl | ............... | F01D 5/141 |
| | | | | 29/527.6 |
| 6,261,053 B1 * | 7/2001 | Anderson | ............... | F01D 5/08 |
| | | | | 415/115 |
| 6,579,061 B1 * | 6/2003 | Heyward | ............... | F01D 5/143 |
| | | | | 29/889.22 |
| 6,672,832 B2 * | 1/2004 | Leeke | ............... | F01D 5/143 |
| | | | | 415/191 |
| 7,334,983 B2 * | 2/2008 | Alvanos | ............... | F01D 5/081 |
| | | | | 415/115 |
| 8,152,456 B2 * | 4/2012 | Aubin | ............... | F01D 5/143 |
| | | | | 415/173.1 |
| 8,439,643 B2 * | 5/2013 | Kuhne | ............... | F01D 5/143 |
| | | | | 416/193 A |
| 8,459,956 B2 * | 6/2013 | Pandey | ............... | F01D 5/143 |
| | | | | 416/190 |
| 8,647,067 B2 * | 2/2014 | Pandey | ............... | F01D 5/143 |
| | | | | 416/193 A |
| 8,939,727 B2 * | 1/2015 | Campbell | ............... | F01D 11/008 |
| | | | | 416/193 A |
| 8,961,135 B2 * | 2/2015 | Beeck | ............... | F01D 5/143 |
| | | | | 416/193 A |
| 9,127,562 B2 * | 9/2015 | Raible | ............... | F01D 5/143 |
| 9,194,235 B2 * | 11/2015 | Wunderer | ............... | F01D 5/145 |
| 10,190,416 B2 * | 1/2019 | Zscherp | ............... | F01D 5/10 |
| 2003/0129055 A1 * | 7/2003 | Leeke | ............... | F01D 5/143 |
| | | | | 415/191 |
| 2012/0051930 A1 * | 3/2012 | Pandey | ............... | F01D 5/143 |
| | | | | 416/223 A |
| 2012/0230826 A1 * | 9/2012 | Raible | ............... | F01D 5/143 |
| | | | | 416/196 R |
| 2014/0301852 A1 * | 10/2014 | Zscherp | ............... | F01D 5/10 |
| | | | | 416/203 |
| 2017/0022839 A1 * | 1/2017 | Lewis | ............... | F01D 5/143 |

FOREIGN PATENT DOCUMENTS

| | | |
|---|---|---|
| GB | 2079399 | 1/1982 |
| JP | 56104101 | 8/1981 |

* cited by examiner

TURBINE BLADE INCLUDING BALANCED MATEFACE CONDITION

TECHNICAL FIELD

The present disclosure relates generally to blade configurations for utilization in turbines such as gas powered turbine engines, and specifically to a mateface configuration of the same.

BACKGROUND

Gas powered turbines, such as those utilized in aircraft engines, land based turbines, and the like, include a compressor that compresses a fluid, a combustor in which hot combustion gasses are generated, and a turbine section across which the combustion gasses are expanded. Within the turbine are multiple stages, each including multiple turbine blades. The interaction between the expanding combustion gasses and the airfoil shaped turbine blades drives the turbine to rotate. The rotation of the turbine is provided to one or more other systems, such as a fan in a geared turbofan example, via a shaft connected to the turbine.

In order to construct each stage, the turbine blades within the stage are arranged in a circumferential ring. As a result of the circumferential ring arrangement, a corresponding platform of each blade includes two matefaces, one for each circumferentially adjacent turbine blade. When the matefaces are not at identical radial heights, waterfall and/or damming conditions can occur in fluid flow across the platform and can have negative impacts on the turbine gases flowing through the turbine stage.

SUMMARY OF THE INVENTION

In one exemplary embodiment a blade for a gas powered turbine includes a platform having a leading edge and a trailing edge, the leading edge being connected to the trailing edge by a suction side mateface and by a pressure side mateface, a blade extending outward from the platform, the blade having a foil shaped cross section, wherein a suction side of the blade faces the suction side mateface, and a pressure side of the blade faces the pressure side mateface, and a radial height of the suction side mateface is different from a radial height of the pressure side mateface at a first axial position.

In another example of the above described blade for a gas powered turbine a difference between the radial height of the suction side mateface and the radial height of the pressure side mateface at the first axial position is an ideal disparity for a balanced manufacturing range at the first axial position.

In another example of any of the above described blades for a gas powered turbine the ideal balanced manufacturing range is a targeted radial height difference configured to balance negative waterfall effects and negative damming effects that arise due to manufacturing variability.

In another example of any of the above described blades for a gas powered turbine the ideal disparity is in a range of disparities that generate a waterfall effect in an assembled rotor system.

In another example of any of the above described blades for a gas powered turbine the platform further comprises a contoured radially outward facing surface, and wherein at least one contour of the contoured radially outward facing surface extends to one of the suction side mateface and the pressure side mateface.

In another example of any of the above described blades for a gas powered turbine the radial height of the suction side mateface is different from the radial height of the pressure side mateface at a second axial position, and wherein the difference at the second axial position is distinct from the difference at the first axial position.

In another example of any of the above described blades for a gas powered turbine the radial height of the suction side mateface is the same as the radial height of the pressure side mateface at a third axial position.

In another example of any of the above described blades for a gas powered turbine the third axial position is between the first axial position and the second axial position.

In another example of any of the above described blades for a gas powered turbine the blade is a rotor blade for one of a turbine based aircraft engine and a land based turbine.

In one exemplary embodiment a component for a gas powered turbine includes a platform having a leading edge and a trailing edge, the leading edge being connected to the trailing edge by a first side mateface and by a second side mateface circumferentially opposite the first side mateface, and a radial height of the first side mateface is different from a radial height of the second side mateface at a first axial position.

In another example of the above described component for a gas powered turbine a difference between the radial height of the first side mateface and the radial height of the second side mateface at the first axial position is an ideal disparity for a balanced manufacturing range at the first axial position, and the ideal balanced manufacturing range is a targeted radial height difference configured to balance negative waterfall effects and negative damming effects that arise due to manufacturing variability.

In another example of any of the above described components for a gas powered turbine the ideal disparity is in a range of disparities that generate a waterfall effect in an assembled rotor system.

In another example of any of the above described components for a gas powered turbine the platform further comprises a contoured radially facing surface, and wherein at least one contour of the contoured radially facing surface extends to one of the first side mateface and the second side mateface.

In another example of any of the above described components for a gas powered turbine the radial height of the first side mateface is different from the radial height of the second side mateface at a second axial position, and wherein the difference at the second axial position is distinct from the difference at the first axial position.

In another example of any of the above described components for a gas powered turbine the radial height of the first side mateface is the same as the radial height of the second side mateface at a third axial position.

In one exemplary embodiment a gas powered turbine includes a compressor section, a combustor section fluidly connected to the compressor section, a turbine section fluidly connected to the combustor section, at least one of the compressor section and the turbine section including a rotor stage comprised of a plurality of rotor blades, wherein each of the rotor blades includes a blade extending outward from a platform, the blade having a foil shaped cross section, wherein a suction side of the blade faces a suction side mateface of the platform, and a pressure side of the blade faces a pressure side mateface of the platform and a radial height of the suction side mateface is different from a radial height of the pressure side mateface at a first axial position, such that a radial height disparity exists across a mateface gap at any given axial position.

In another example of the above described gas powered turbine the mateface gap is a gap disposed between a suction side mateface of a first platform and a pressure side mateface of a second platform circumferentially adjacent to the first platform.

In another example of any of the above described gas powered turbines the radial height disparity is an ideal disparity for a balanced manufacturing range at a first axial position.

In another example of any of the above described gas powered turbines the ideal balanced manufacturing range is a targeted radial height difference configured to balance negative waterfall effects and negative damming effects that arise due to manufacturing variability.

These and other features of the present invention can be best understood from the following specification and drawings, the following of which is a brief description.

DETAILED DESCRIPTION OF AN EMBODIMENT

Figure 1:
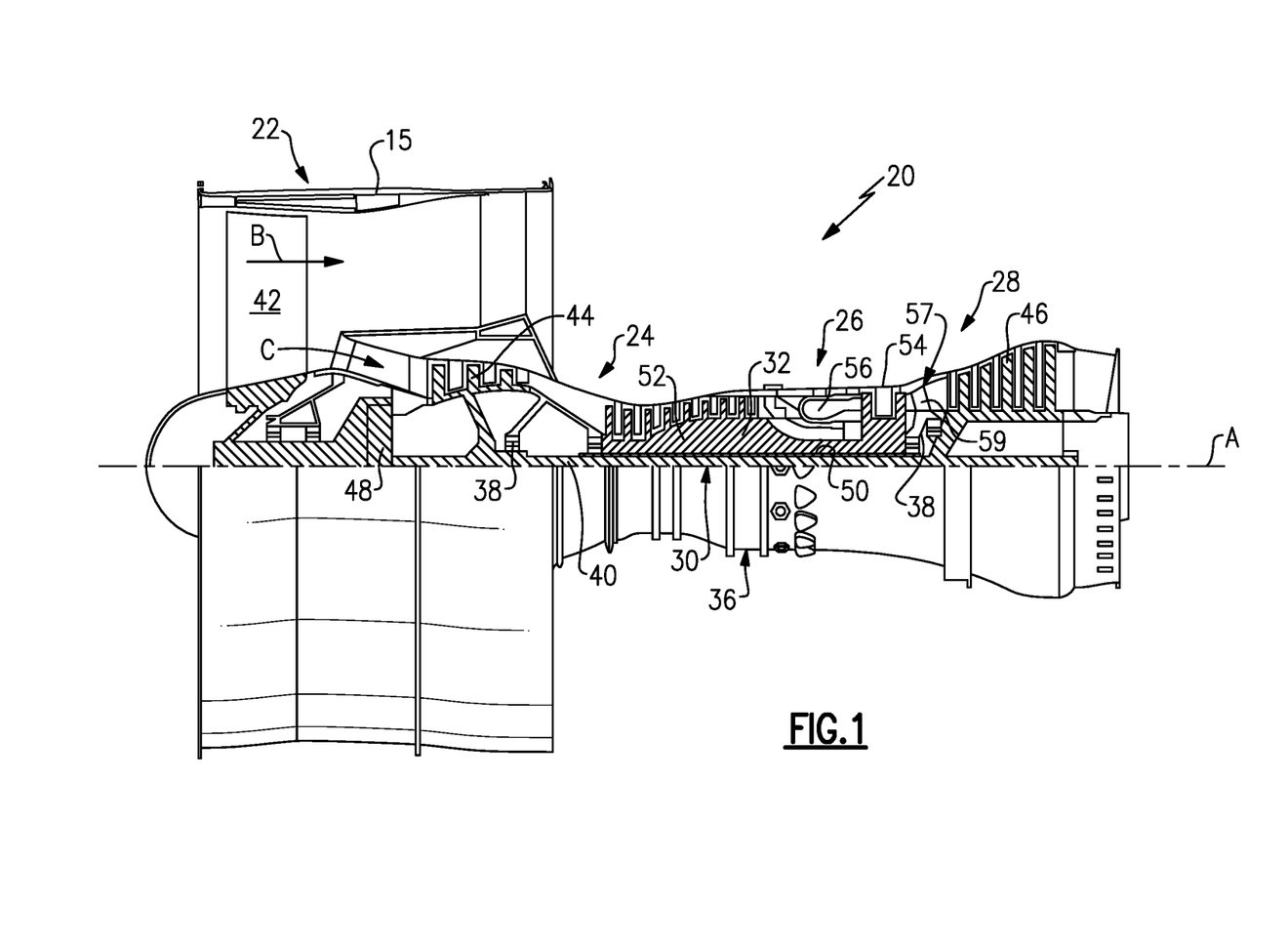
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2A:
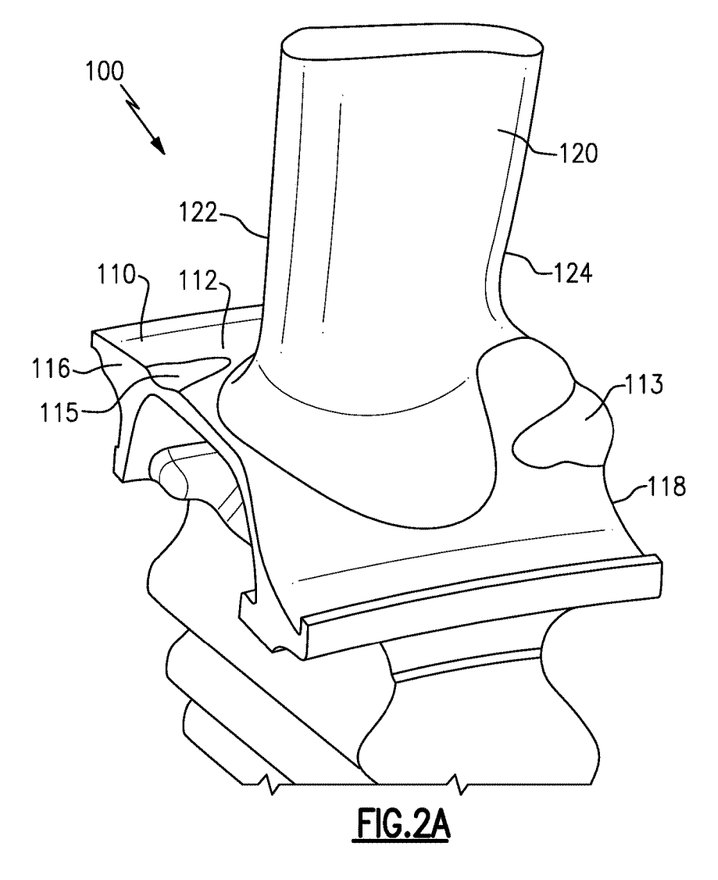
FIG. 2A schematically illustrates an isometric view of a turbine blade for a gas powered turbine.
Figure 2B:
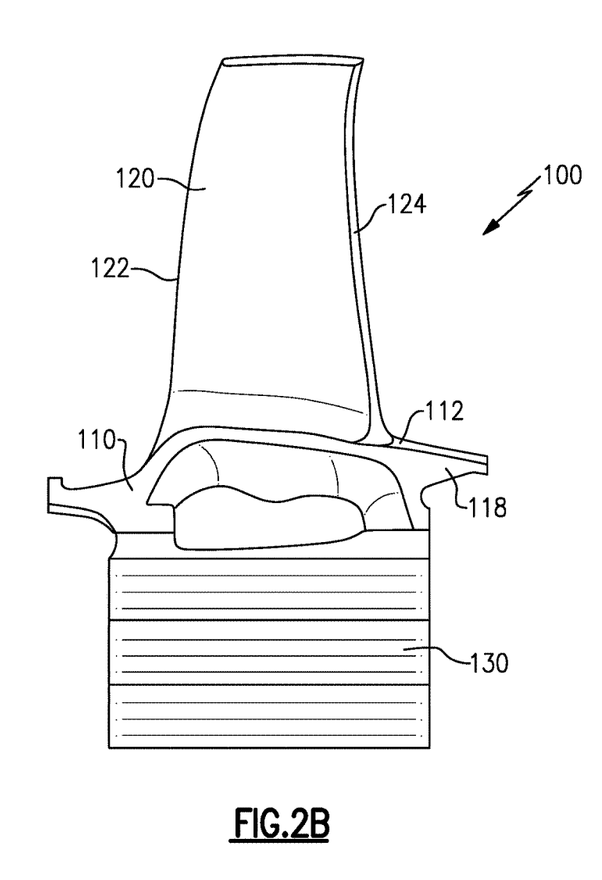
FIG. 2B schematically illustrates a side view of the turbine blade of FIG. 2A.

With continued reference to FIG. 1, FIGS. 2A and 2B schematically illustrate a turbine blade 100 for utilization in one stage of the turbine engine 20 in an isometric view (FIG. 2A) and a pressure side view (FIG. 2B). The turbine blade 100 includes a platform 110, from which a blade 120 extends radially outward and a root 130 extends radially inward. The blade 120 has an airfoil shaped profile with a leading edge 122 and a trailing edge 124, and can include cooling features, pass-throughs, cavities, and the like according to any known rotary blade design. The root 130 interfaces with a shaft structure of the turbine engine 20 and allows the rotation of the blade to be translated to a corresponding turbine shaft.

In order to further facilitate fluid flow through the turbine, the platform 110 includes a contoured radially outward facing surface 112 that defines an inner radius of the turbine primary flowpath along an axial length of the platform 110. As used herein, "axial" and "radial" refer to an axis and radius defined by a ring of turbine blades 100 installed in an exemplary gas powered turbine. The contours are defined by radially outward bumps 113 and radially inward dimples or grooves 115, and are cast along with the platform 110. Contouring the platform serves to mitigate the negative impact of secondary flow structures on turbine blade 120 performance by modifying the near-platform pressure distribution. The platform 110 further includes matefaces 116, 118 on edges of the platform 110 corresponding to the suction side (mateface 116) and on the pressure side (mateface 118) of blade 120. These edges are referred to as the suction side mateface 116 and the pressure side mateface 118. When arranged in an installed configuration, the pressure side mateface 118 of a given turbine blade 100 faces the suction side mateface 116 of a circumferentially adjacent turbine blade 100.

Figure 3:
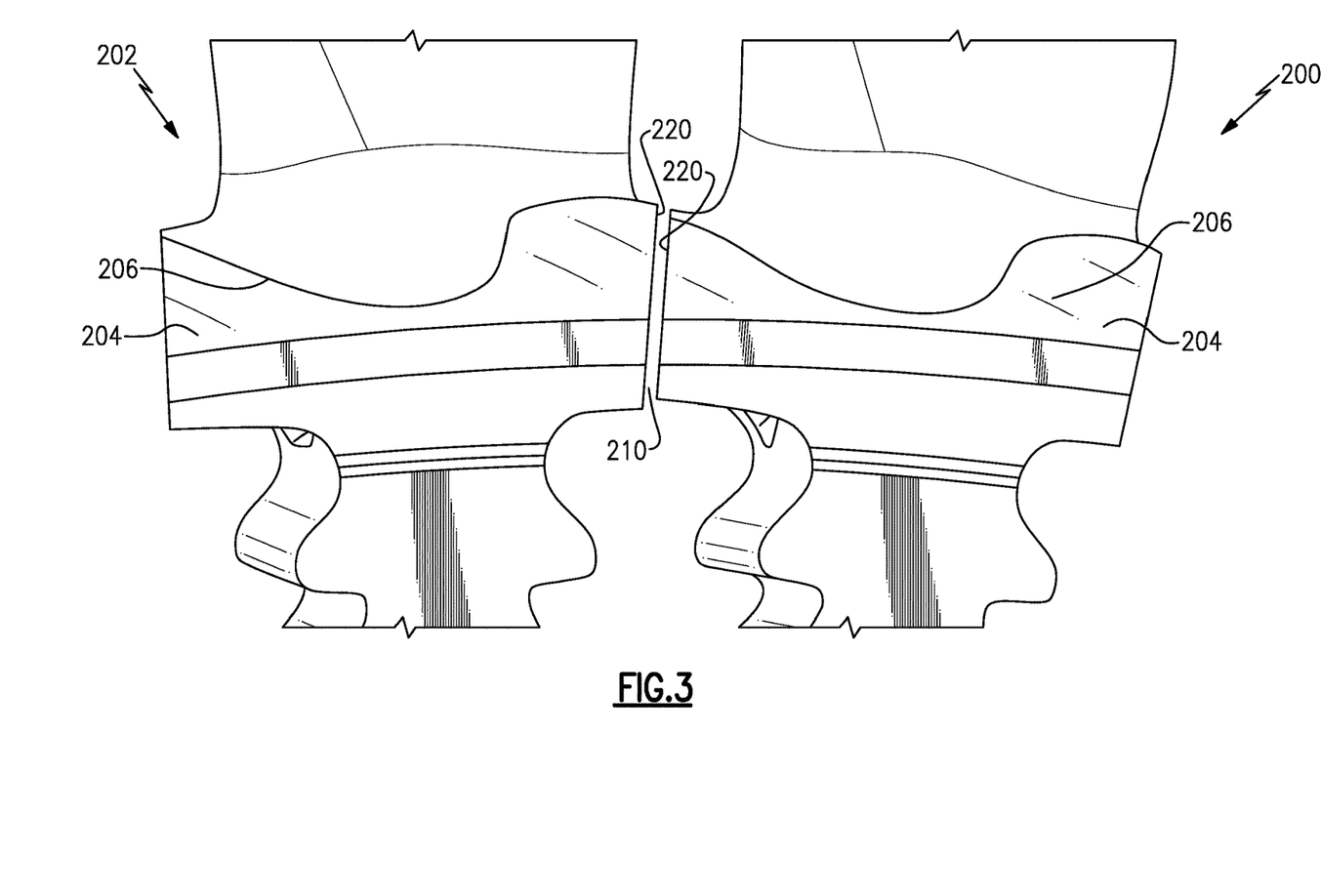
FIG. 3 schematically illustrates an axially aftward facing view of two turbine blades within a single stage from an axially forward viewing position.

With continued reference to FIGS. 2A and 2B, FIG. 3 schematically illustrates an axially aftward facing view of two turbine blades 200, 202 within a single stage of a turbine engine. FIG. 3 is illustrated from an axially forward viewing position. As with the examples of FIGS. 2A and 2B, each of the blades 200, 202 includes a platform 204 having a contoured radially outward facing surface 206. A mateface gap 210 is positioned between adjacent matefaces 220 of the blades 200, 202. The illustrated mateface 210 of FIG. 3 is exaggerated, relative to the features of the blades 200, 202, for illustrative effect.

During operation of the gas powered turbine, the blades 200, 202 affect the flow of the combustion products, and the flow is not fully aligned with the axis of the turbine. As a result, the combustion product flow passes over the mateface gap 210 between the blades 200, 202 at one or more positions along the mateface gap 210.

In an ideal configuration, the radially outward surface of the platforms 204 at the matefaces 220 are the same radial height on both sides of the mateface gap 210. The radial height of the platform 204 at any given point refers to the distance from the radially outward facing contoured surface 206 of the platform 204 to a centerline of the ring defined by an assembled turbine stage including the blades 200, 202. As can be appreciated by those of skill in the art, however, manufacturing tolerances can lead to one platform surface 206 having a larger or smaller radial height than the circumferentially adjacent platform surface 206 across the mateface gap 210 despite the blades being manufactured to the same specification.

With continued reference to FIGS. 2A, 2B, and 3, FIG. 4 schematically illustrates possible mateface radial height configurations 302, 304, 306 for a general turbine blade configuration. The configurations 302, 304, 306 account for variances in the manufacturing tolerances of the blades. In each of the configurations 302, 304, 306, a flow 310 crosses a mateface gap 320. In the first configuration 302, the flow 310 passes from a radially higher platform 332 to a radially lower platform 334, and a waterfall region 312 is introduced into the flow. In the second configuration 304, the platforms 342, 344 are the same radial height, and the flow 310 passes directly over the mateface gap 320 with the mateface gap 320 having minimal effect on the flow 310. In the third configuration 306, the flow 310 passes from a radially shorter platform 352 to a radially higher platform 354. The flow 310 crossing the mateface gap 320 to a higher platform 354 introduces a damming region 314 into the flow 310.

Figure 4:
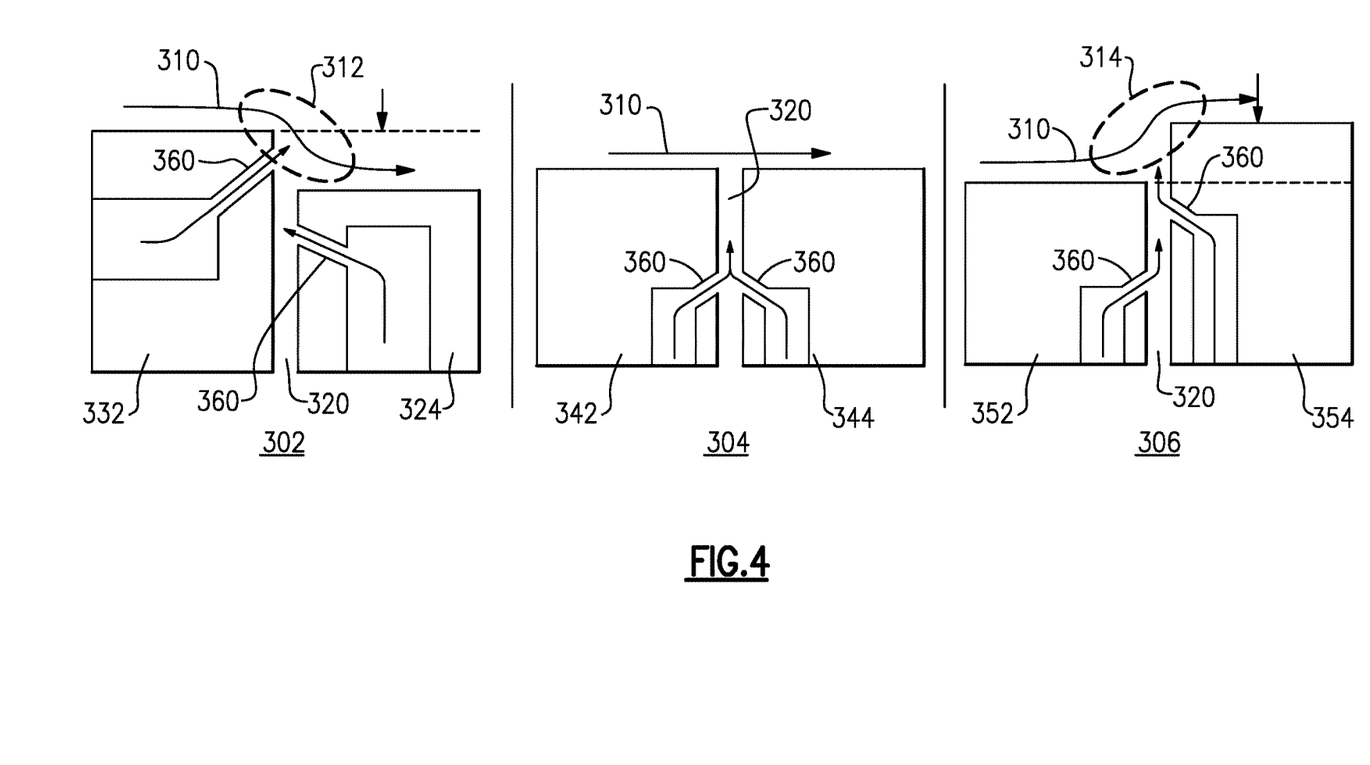
FIG. 4 schematically illustrates possible mateface configurations for a general turbine blade configuration.

When both the pressure side mateface 118 and the suction side mateface 116 are designed to be at an equal radial height (the second configuration 304), there is an equal chance of either a dam (the third configuration 306) or a waterfall (the first configuration 302) due to manufacturing tolerances and manufacturing related variability in a blade casting process. However, the effects of a waterfall region are not commensurate with the effects of an equally sized damming region. In most applications, if a mateface gap 320 disparity is a foregone conclusion, introduction of a waterfall region 312 is preferred over an equally sized damming region 314.

Further exemplified in FIG. 4 are multiple mateface features 360. The exemplary mateface features 360 are drilled cooling outlet holes providing a cooling fluid outlet for internal cooling systems. One of skill in the art will appreciate, however, that the mateface features are not limited to cooling outlet holes, and that the waterfall and damming airflow effects are present with matefaces including mateface features and with matefaces that do not include mateface features.

Figure 5:
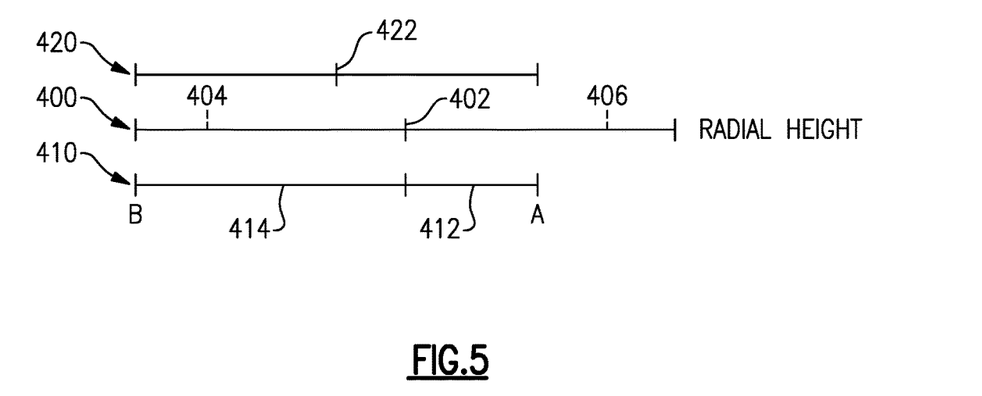
FIG. 5 illustrates a tolerance range chart for balancing non-ideal mateface conditions.

With continued reference to FIG. 4, FIG. 5 illustrates a normalized range 400 of radial height disparities for adjacent matefaces in a gas turbine engine component. At an "ideal" position 402 within the range 400, the disparity between the matefaces is zero. In other words, the radial height on each side of the mateface gap is the same. The far left end of the range 400 has a normalized radial disparity of −1, meaning that the flow origination side of the mateface gap is radially higher. While the far right end of the range has a normalized disparity of +1, meaning that the flow origination side of the mateface gap is radially lower. Manufacturing variances typically occur at +/− the ideal in the same value. If the targeted radial height is positioned at the ideal position 402, damming and waterfalling conditions will occur with equal frequency. Also shown in the range 400 of radial height disparities is a tolerance range from point 404 to point 406. The tolerance range represents the range of radial heights that can be expected, accounting for manufacturing variances, if the ideal point 402 is the targeted radial height disparity between the facing matefaces.

Illustrated below the range 400 is an equivalent effect range 410. The equivalent effect range 410 illustrates the region of the disparity range 400 above the ideal point 402 and below the ideal point 402 where a waterfall and damming effect are equivalently negative. In the illustrated example, the damming effect region 412 extends to +0.5 (A), while the waterfall effect region 414 extends to −1 (B). In other words, the exemplary damming effect is twice as negative as a waterfall resulting from the same radial height disparity.

Illustrated above the range 400, is a balanced manufacturing range 420. By shifting a targeted radial height disparity 422 into the waterfall region 414, the total range of radial height differentials that can result, due to manufacturing variances, is the same as the equivalent effect range 410. While described in regards to FIG. 5 using normalized differentials of −1/+1, one of skill in the art will understand that these example values are for illustrative purposes, and any actual manufacturing range can be accommodated in the manner described herein. Similarly, it is not necessarily true that the waterfall region 414 of a given implementation will be exactly half as negative as the damming region 412 as in the example. One of skill in the art, having the benefit of this disclosure, will be able to adapt the disclosed targeted manufacturing point 422 to accommodate the actual expected range difference.

With continued reference to FIGS. 2A-5, FIG. 6 schematically illustrates a radially inward facing view of two turbine blades 500, 502 within a single stage of a turbine. The blades 500, 502 are illustrated from a radially outward viewing position. Due to the change in momentum imposed by the airfoil shaped blades 510 onto the flow, the flow 530 across the turbine stage is curved. As a result of the curved flow 530, the direction of flow across the mateface gap 440 varies depending on which of three regions 552, 554, 556 the flow 530 is passing through. In the first region, the flow 530 is crossing from the second blade 502 to the first blade 504. In the second region, the flow is traveling linearly along with the mateface gap 540. In the third region 556, the flow is crossing from the first blade 500 to the second blade 502.

Figure 6:
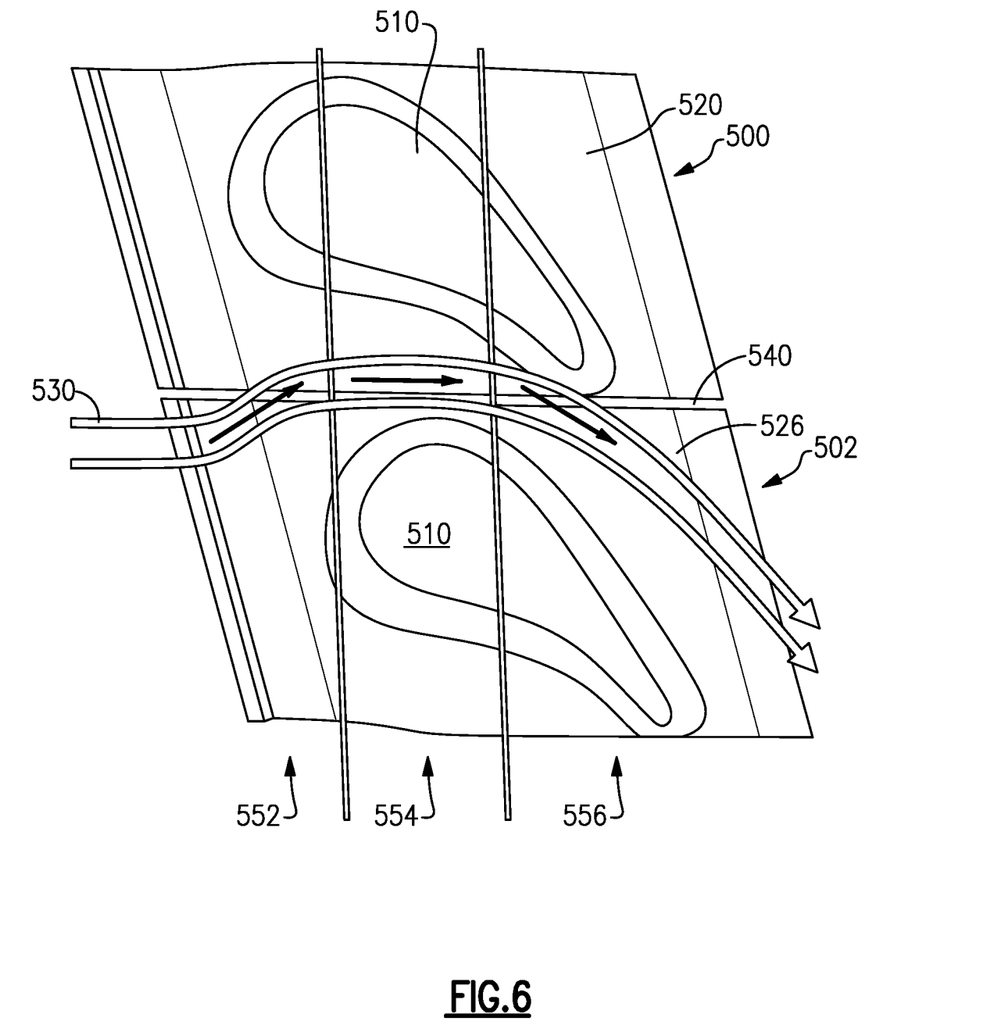
FIG. 6 schematically illustrates a radially inward facing view of two turbine blades within a single stage from a radially outward viewing position.

As each blade 500, 502 includes identically specified dimensions, the targeted radial height difference across the mateface gap 540 at a single axial position is the same as the difference between the radial heights of the suction side mateface at that axial position and the pressure side mateface at that axial position of a single blade 500, 502. Thus, in order to generate the balanced condition between facing matefaces of adjacent blades, a radial height difference between the pressure side mateface edge and the suction side mateface edge at a single axial position of each blade 500, 502 is manufactured to be at the targeted radial height for the targeted radial height difference.

While illustrated and described herein within the context of a gas turbine engine, and specifically within a geared turbofan gas turbine engine, one of skill in the art having the benefit of this disclosure will understand that the turbine blades including a balanced mateface configuration can be adapted for use in any other turbine system including, but not limited to, direct drive turbine engines, land based turbines, and marine based turbines. Further, one of skill in the art will understand that the above described mateface configurations can be applied to any rotary stage including multiple circumferentially adjacent components. Further, the mateface configurations disclosed herein can be applied to static hardware such as stators/vanes, blade air seals, and any other turbine hardware including mateface gaps.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade for a gas powered turbine comprising:
a platform having a leading edge and a trailing edge, the leading edge being connected to the trailing edge by a suction side mateface and by a pressure side mateface;
a blade extending outward from said platform, the blade having an airfoil shaped cross section, wherein a suction side of the blade faces the suction side mateface, and a pressure side of the blade faces the pressure side mateface; and
a radial height of the suction side mateface is different from a radial height of the pressure side mateface at a first axial position, and wherein a difference between the radial height of the suction side mateface and the radial height of the pressure side mateface at the first axial position is an ideal disparity for a balanced manufacturing range at the first axial position.

2. The blade of claim 1, wherein the ideal balanced manufacturing range is a radial height difference configured to balance negative waterfall effects and negative damming effects that arise due to manufacturing variability.

3. The blade of claim 1, wherein the ideal disparity is in a range of disparities that generate a waterfall effect in an assembled rotor system.

4. The blade of claim 1, wherein the platform further comprises a contoured radially outward facing surface, and wherein at least one contour of the contoured radially outward facing surface extends to one of said suction side mateface and said pressure side mateface.

5. The blade of claim 4, wherein the radial height of the suction side mateface is different from the radial height of the pressure side mateface at a second axial position, and wherein the difference at the second axial position is distinct from the difference at the first axial position.

6. The blade of claim 5, wherein the radial height of the suction side mateface is the same as the radial height of the pressure side mateface at a third axial position.

7. The blade of claim 6, wherein the third axial position is between the first axial position and the second axial position.

8. The blade of claim 1, wherein the blade is a rotor blade for one of a turbine based aircraft engine and a land based turbine.

9. A gaspath component for a gas powered turbine comprising:
a platform having a leading edge and a trailing edge, the leading edge being connected to the trailing edge by a first side mateface and by a second side mateface circumferentially opposite the first side mateface; and
a radial height of the first side mateface is different from a radial height of the second side mateface at a first axial position, wherein a difference between the radial height of the first side mateface and the radial height of the second side mateface at the first axial position is an ideal disparity for a balanced manufacturing range at the first axial position, and the ideal balanced manufacturing range is a radial height difference configured to balance negative waterfall effects and negative damming effects that arise due to manufacturing variability.

10. The gaspath component of claim 9, wherein the ideal disparity is in a range of disparities that generate a waterfall effect in an assembled rotor system.

11. The gaspath component of claim 9, wherein the platform further comprises a contoured radially facing surface, and wherein at least one contour of the contoured radially facing surface extends to one of said first side mateface and said second side mateface.

12. The gaspath component of claim 11, wherein the radial height of the first side mateface is different from the radial height of the second side mateface at a second axial position, and wherein the difference at the second axial position is distinct from the difference at the first axial position.

13. The gaspath component of claim 12, wherein the radial height of the first side mateface is the same as the radial height of the second side mateface at a third axial position.

14. A gas powered turbine comprising:
a compressor section;
a combustor section fluidly connected to the compressor section;

a turbine section fluidly connected to the combustor section;

at least one of said compressor section and said turbine section including a rotor stage comprised of a plurality of rotor blades, wherein each of said rotor blades includes a blade extending outward from a platform, the blade having an airfoil shaped cross section, wherein a suction side of the blade faces a suction side mateface of the platform, and a pressure side of the blade faces a pressure side mateface of the platform and a radial height of the suction side mateface is different from a radial height of the pressure side mateface at a first axial position, such that a radial height disparity exists across a mateface gap at any given axial position wherein the radial height disparity is an ideal disparity for a balanced manufacturing range at a first axial position.

15. The gas powered turbine of claim 14, wherein the mateface gap is a gap disposed between a suction side mateface of a first platform and a pressure side mateface of a second platform circumferentially adjacent to the first platform.

16. The gas powered turbine of claim 14, wherein the ideal balanced manufacturing range is a radial height difference configured to balance negative waterfall effects and negative damming effects that arise due to manufacturing variability.

* * * * *